United States Patent Office 2,952,690
Patented Sept. 13, 1960

2,952,690

ANTHRAQUINONE DYESTUFFS

Henri Riat, Arlesheim, Switzerland, assignor to Ciba Limited, Basel, Switzerland, a Swiss firm No Drawing. Filed Mar. 3, 1958, Ser. No. 718,479

Claims priority, application Switzerland Mar. 12, 1957

1 Claim. (Cl. 260—372)

This invention provides new dyestuffs of the anthraquinone series which contain at least two groups imparting solubility in water and correspond to the general formula (1) 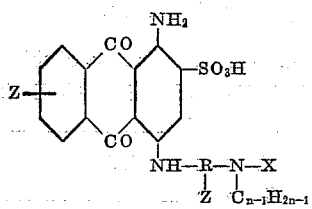

in which $n$ is the whole number 1, 2 or 3, R represents a benzene radical, X represents a β-halogenated propionyl radical, and one Z represents a sulfonic acid group and the other Z represents a hydrogen atom or a sulfonic acid group.

The invention also provides a process for the manufacture of the above anthraquinone dyestuffs, wherein an anthraquinone dyestuff of the formula (2) 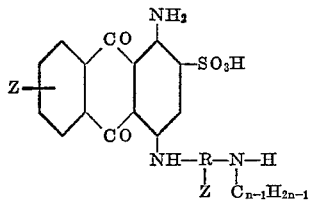

in which $n$, R and Z have the meanings given above, is acylated with a β-halogenated propionic acid anhydride or halide.

As anthraquinone dyestuffs of the Formula 2 there are advantageously used those which contain a free amino group bound to the benzene nucleus R in meta-position or advantageously in para-position to the —NH-group, and in which the benzene nucleus may contain further substituents, such as alkyl groups or a sulfonic acid group.

As examples of anthraquinone dystuffs of the Formula 2 there may be mentioned 1-amino-4-(4'-amino-phenylamino)-anthraquinone-2:3'-disulfonic acid or -2:2'-disulfonic acid, 1-amino-4-(4'-aminophenylamino)-anthraquinone-2:5-, -2:6-, -2:7- or -2:8-disulfonic acid, 1-amino-4 - (4' - aminophyenylamino) - anthraquinone - 2:5:3'-, -2:6:3'-, -2:7:3'- or -2:8:3'-trisulfonic acid and 1-amino-4-(3'-aminophenylamino) - anthraquinone-2:4'-disulfonic acid.

As anhydrides or halides there may be used, for example, β-chloropropionic anhydride and especially the chloride of β-chloro- or of β-bromo-propionic acid.

The acylation of the aforesaid anthraquinone dyestuffs with these anhydrides or halides is advantageously carried out in the presence of an acid-binding agent, such as sodium acetate, sodium hydroxide or sodium carbonate, advantageously in an aqueous medium. It is often of advantge to use in excess of the acylating agent, and to carry out the acylation at a pH value between 5 and 8.

Especially valuable and easily accessible are the dyestuffs of the Formula 1, which correspond to the constitution

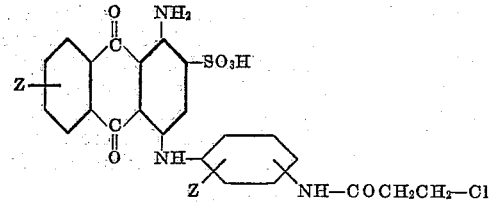

in which at least one of the two substituents Z represents a sulfonic acid group and the other a hydrogen atom or a sulfonic acid group.

The new dyestuffs of this invention are valuable for dyeing or printing a very wide variety of materials, especially polyhydroxylated fibrous materials, such as natural or regenerated cellulose, and nitrogenous textile materials such as silk, leather, and wool, and also synthetic fibers of superpolyamides or superpolyurethanes.

The dyestuffs of this invention can be applied, for example, to cellulose fibers by a direct dyeing method, a printing method or a so-called pad dyeing method, and fixed on the fiber by the action of heat and an alkali. In order to improve the properties of fastness it is of advantage to subject dyeings or prints so produced to thorough rinsing with cold and hot water, if desired, with the addition of an agent having a dispersing action and assisting diffusion. The dyeings and prints produced by the aforesaid methods are distinguished by the good purity of their tints, by their very good fastness to light and by their excellent properties of wet fastness.

The following examples illustrate the invention, the parts and percentages being by weight:

Example 1

48.9 parts of 1-amino-4-(4'-aminophenylamino)-anthraquinone-2:3'-disulfonic acid are dissolved in 1000 parts of water together with a quantity of sodium carbonate sufficient to give a neutral solution. To the solution are added in portions 26 parts of β-chloropropionic acid chloride, which are diluted with 20 parts of toluene, and the mineral acid formed is neutralized by the addition of a sodium carbonate solution of 10% strength, during which the temperature is maintained between 25° C. and 35° C. When the condensation is finished, the blue dyestuff is salted out, filtered off and dried. It dissolves in water with a deep blue coloration, and dyes wool from a neutral or acid bath fast blue tints. By applying the dyestuff to cotton by the pad dyeing process described in Example 4, there are obtained very pure blue tints. The dyeings are distinguished by their very good properties of fastness to washing and light.

Dyestuffs which likewise dye cotton very fast blue tints are obtained by acylating the following dyestuffs in the manner described above with β-chloropropionyl chloride:

(1) 1-amino-4-(3'-aminophenylamino) - anthraquinone-2:4'-disulfonic acid.
(2) 1-amino-4-(4'-aminophenylamino) - anthraquinone-2:8:3'-trisulfonic acid.
(3) 1-amino-4-(4'-aminophenylamino) - anthraquinone-2:5-disulfonic acid.
(4) I-amino-4-(4'-aminophenylamino) - anthraquinone-2:5:3'-trisulfonic acid.
(5) 1-amino-4-(4'-aminophenylamino) - anthraquinone-2.2'-disulfonic acid.

Example 2

The procedure is the same as in Example 1 except that 30 parts of β-bromopropionic acid chloride are used instead of 26 parts of β-chloropropionyl chloride. There is obtained a dyestuff which dyes cotton blue tints having very similar properties.

*Example 3*

2 parts of the dyestuff obtained as described in Example 1 are dissolved in 4000 parts of water, 10 parts of crystalline sodium sulfate are added to the dyebath, and 100 parts of wool are entered at 40–50° C. There are then added 2 parts of acetic acid of 40% strength, the dyebath is raised to the boil in the course of ½ hour and dyeing is carried on at that temperature for ¾ hour. After rinsing and drying the material, there is obtained a blue dyeing which is very fast to washing and fulling.

*Example 4*

2 parts of the dyestuff obtained as described in Example 1 are dissolved in 100 parts of water. A cotton fabric is impregnated with the resulting solution at 80° C. on a foulard, and the excess of liquid is squeezed from the fabric until it retains 75% of its weight of dyestuff solution.

The fabric so impregnated is dried, and then impregnated at room temperature with a solution containing, per liter, 10 grams of sodium hydroxide and 300 grams of sodium chloride, the fabric is squeezed to a weight increase of 75%, and is then steamed for 60 seconds at 100–101° C. It is then rinsed, treated in sodium bicarbonate solution of 0.5% strength, rinsed, soaped at the boil for ¼ hour in a solution of 0.3% strength of a non-ionic detergent, then rinsed and dried. There is obtained a blue dyeing fixed fast to boiling. By using, instead of a cotton fabric, a fabric of staple fibers of regenerated cellulose a similar good result is obtained.

A similar good result is obtained by carrying out the impregnation with the dyestuff solution at 30° C. instead of 80° C.

What is claimed is:

An anthraquinone dyestuff which in its free acid state corresponds to the formula

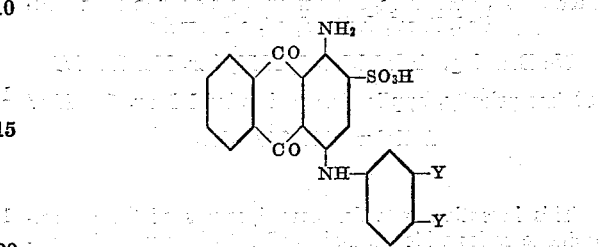

wherein one Y is a sulfonic acid group and the other a β-halogenopropionylamino group.

References Cited in the file of this patent
UNITED STATES PATENTS 2,713,059     Gunthard _____ July 12, 1955

FOREIGN PATENTS 889,197     Germany _____ Sept. 7, 1953
1,115,502     France _____ Jan. 3, 1956